(12) United States Patent
Ahmad et al.

(10) Patent No.: US 11,748,317 B2
(45) Date of Patent: Sep. 5, 2023

(54) MANAGEMENT SYSTEM, METHOD FOR MANAGEMENT BY MANAGEMENT SYSTEM, AND RECORDING MEDIUM

(71) Applicant: Hitachi, Ltd., Tokyo (JP)

(72) Inventors: Avais Ahmad, Tokyo (JP); Shinichi Hayashi, Tokyo (JP); Satoshi Kaneko, Tokyo (JP); Takashi Tameshige, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/693,214

(22) Filed: Mar. 11, 2022

(65) Prior Publication Data

US 2023/0079305 A1    Mar. 16, 2023

(30) Foreign Application Priority Data

Sep. 10, 2021    (JP) ................................ 2021-147553

(51) Int. Cl.

| | |
|---|---|
| *G06F 16/21* | (2019.01) |
| *G06F 16/26* | (2019.01) |
| *G06F 16/25* | (2019.01) |
| *G06F 11/30* | (2006.01) |
| *G06F 11/34* | (2006.01) |

(52) U.S. Cl.
CPC ........ *G06F 16/211* (2019.01); *G06F 11/3034* (2013.01); *G06F 11/3423* (2013.01); *G06F 16/256* (2019.01); *G06F 16/26* (2019.01)

(58) Field of Classification Search
CPC ............... G06F 16/211; G06F 11/3034; G06F 11/3423; G06F 16/256; G06F 16/26
See application file for complete search history.

(56) References Cited

U.S. PATENT DOCUMENTS

| | | | |
|---|---|---|---|
| 8,429,140 B1 | 4/2013 | Lolayekar et al. | |
| 8,650,165 B2 | 2/2014 | Thakur et al. | |
| 2017/0228291 A1* | 8/2017 | Mokhtarzada | ...... G06F 16/1824 |
| 2017/0346821 A1* | 11/2017 | Yedidi | ................. H04L 63/0876 |
| 2019/0081971 A1* | 3/2019 | Jones | .................... G06F 21/552 |
| 2020/0293546 A1* | 9/2020 | Goldberg | ............ G06F 16/1734 |

* cited by examiner

*Primary Examiner* — Cam Y T Truong
(74) *Attorney, Agent, or Firm* — Procopio, Cory, Hargreaves & Savitch LLP

(57) ABSTRACT

Provided is a management system for managing a relation between a database and a volume without installing an agent. A management system manages a relation between a data catalog and a volume of a storage system storing data to be used by the data catalog. A processor of the management system accesses data that is included in the data catalog and that includes authentication information of the volume; detects the number of accesses to the volume in a time range including a timing of the access to the data; and manages the relation between the data catalog and the volume on the basis of the number of accesses.

9 Claims, 11 Drawing Sheets

FIG. 2A

INFORMATION TABLE T1000

PERFORMANCE DATA T1100

| TIME SERIES (T1110) | IOPS (T1120) | TRANSFER RATE (T1130) |
|---|---|---|
| 2021-02-04 10:19:24 | 4 | 10 kbps |
| 2021-02-04 10:19:29 | 5 | 20 kbps |
| 2021-02-04 10:19:35 | 10 | 30 kbps |
| ⋮ | ⋮ | ⋮ |

TOPOLOGY OBJECT T1200

| ID (T1210) | NAME (T1220) | TYPE (T1230) |
|---|---|---|
| 100 | T1 | TABLE |
| 101 | T2 | TABLE |
| 102 | DB1 | DATABASE |
| 103 | App1 | APPLICATION |
| 104 | Vol1 | VOLUME |
| 105 | Disk1 | DISK |
| ⋮ | ⋮ | ⋮ |

TOPOLOGY LINK T1300

| ID (T1310) | SOURCE (T1320) | TARGET (T1330) |
|---|---|---|
| 500 | 100 | 102 |
| 501 | 101 | 102 |
| 502 | 102 | 103 |
| 503 | 103 | 104 |
| 504 | 104 | 105 |
| ⋮ | ⋮ | ⋮ |

FIG. 2B

INFORMATION TABLE T1000

DATA CATALOG LIST T1400

| ID (T1410) | TYPE (T1420) | ip (T1430) | USER NAME (T1440) | PASSWORD (T1450) |
|---|---|---|---|---|
| 201 | lumada | 10 kbps | admin | 123xyz |
| 202 | Azure | 20 kbps | hitachi | 11qq |
| 203 | lumada | 30 kbps | admin | 1wsdfea |
| : | : | : | : | : |

DATABASE LIST T1500

| ID (T1510) | NAME (T1520) | TYPE (T1530) |
|---|---|---|
| 300 | DB1 | Postgres |
| 301 | DB2 | MySQL |
| 302 | DB3 | MySQL |
| : | : | : |

TABLE LIST T1600

| ID (T1610) | NAME (T1620) | DATABASE (T1630) |
|---|---|---|
| 400 | Customer | DB1 |
| 401 | Salary | DB1 |
| 402 | City | DB2 |
| : | : | : |

VOLUME LIST T1700

| ID (T1710) | LDEV ID (T1720) | LABEL (T1730) |
|---|---|---|
| 600 | 0 | Vol1 |
| 601 | 1 | Vol2 |
| 602 | 2 | Vol3 |
| : | : | : |

FIG. 4

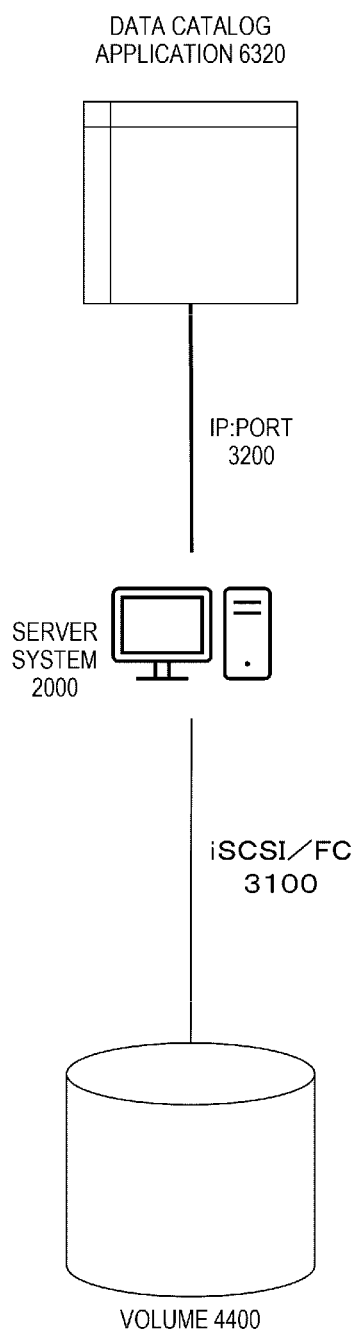

T2000

| ITEM | DESCRIPTION |
|---|---|
| DATA SOURCE TYPE | Hive, HDFS, JDBC (Postgres, MySQL, ETC.) |
| IP ADDRESS | IP OF HOST ON WHICH DATABASE IS EXECUTED |
| PORT | PORT AT WHICH DATABASE OPERATES |
| USER NAME/PASSWORD | AUTHENTICATION INFORMATION OF REGISTERED DATA SOURCE |

T3000

| DATABASE LEVEL INFORMATION | DESCRIPTION |
|---|---|
| MOUNT PATH | DIRECTORY PATH SUCH AS /mnt/ps |
| PUBLIC PORT | PORT AT WHICH DB OPERATES |
| SYSTEM LEVEL INFORMATION | DESCRIPTION |
| HOST NAME | HOST NAME |
| HOST IP | IP ADDRESS OF HOST |
| iSCSI IQN/WWN | IQN FOR STORAGE IDENTIFICATION |

T4000

| ITEM | DESCRIPTION |
|---|---|
| Ldev | AVAILABLE INFORMATION ABOUT ALL VOLUMES |
| iSCSI TARGET/HOST GROUP | STORAGE IDENTIFICATION BY HOST |
| HOST iSCSI IQN/WWN | HOST IDENTIFICATION BY STORAGE |
| LUN PATH | MAPPING BETWEEN VOLUME, PORT, AND iSCSI |

MANAGEMENT SYSTEM, METHOD FOR MANAGEMENT BY MANAGEMENT SYSTEM, AND RECORDING MEDIUM

BACKGROUND OF THE INVENTION

1. Field of the Invention

The present invention relates to a management system, a method for management by a management system, and a recording medium.

2. Description of the Related Art

More specifically, the invention relates to detecting a relation between a database application executable on a server or a virtual machine and a volume storing data to be used by the database application.

Due to developments of hybrid cloud data services, a database and a volume of a storage system as an entity storing data to be used by the database are often arranged in different systems.

From a viewpoint of compliance, when the database is to be deleted, the data to be used by this database also needs to be completely deleted. However, in a hybrid cloud data service including a large number of databases and a large number of storage systems, it is difficult to immediately grasp a correspondence between the database and the volume and delete the data as appropriate.

As a technique corresponding to such a problem, there are techniques disclosed in U.S. Pat. No. 8,429,140 (Patent Literature 1) and U.S. Pat. No. 8,650,165 (Patent Literature 2). In the techniques disclosed in Patent Literature 1 and Patent Literature 2, detection of a relation between a server and a storage is achieved by installing an agent on the server. An "application object manager engine" (agent on a host server machine) determines a mapping between an application object (database application) on a storage system and a storage object thereof (logical volume). The agent is executed in combination with other software of the server.

Installation of the agent on the server as in the techniques disclosed in Patent Literature 1 and Patent Literature 2, however, causes the following problems.

First, for security reasons, a client of the system may not want to share authentication information (credential) of a secure shell (SSH).

Next, the system may execute hundreds of database applications on a virtual machine (VM) or a physical server, and it may be troublesome to manually acquire such authentication information of SSH. This is because the VM usually has a dynamic configuration without central repository of encryption keys.

SUMMARY OF THE INVENTION

The invention is made in view of the above circumstances, and an object thereof is to provide a management system, a method for management by the management system, and a computer program capable of managing a relation between a database and a volume without installing an agent.

In order to solve the above problems, a management system according to one aspect of the invention is a management system for managing a relation between a database and a volume of a storage system storing data to be used by the database. The management system includes a processor. The processor is configured to: access data that is included in the database and that includes authentication information of the volume; detect the number of accesses to the volume in a time range including a timing of the access to the data; and manage the relation between the database and the volume on the basis of the number of accesses.

According to the invention, it is possible to realize a management system, a method for management by the management system, and a computer program capable of managing a relation between a database and a volume without installing an agent.

Problems, configurations, and effects other than those described above are clarified in the following description of embodiments.

BRIEF DESCRIPTION OF THE DRAWINGS

FIG. 2A is a diagram illustrating an example of an information table included in the management system according to the embodiment.

FIG. 2B is a diagram illustrating another example of the information table included in the management system according to the embodiment.

FIG. 4 is a diagram illustrating an example of relevant information in the system applied with the management system according to the embodiment.

DESCRIPTION OF THE PREFERRED EMBODIMENTS

Figure 1:
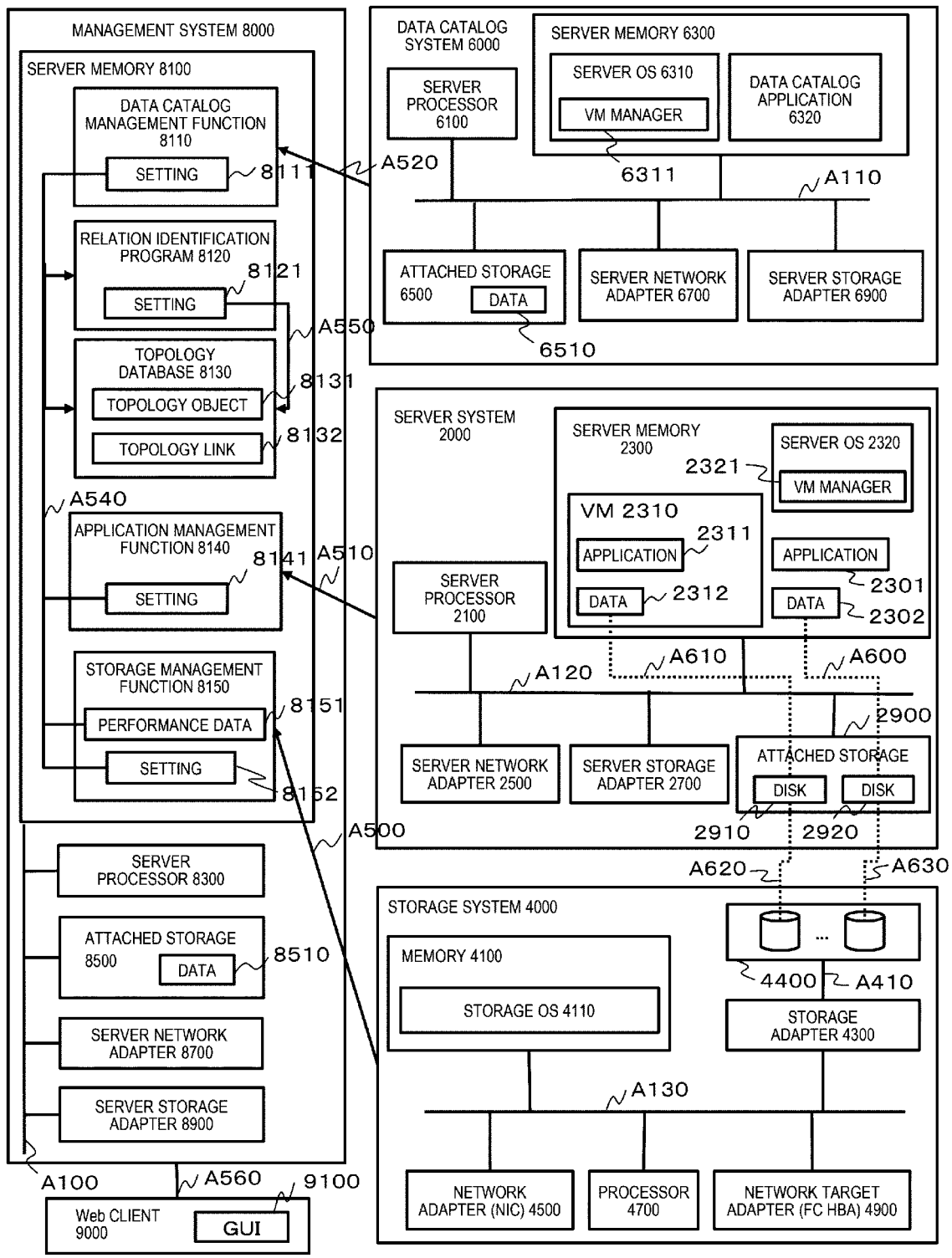
FIG. 1 is a block diagram illustrating an overview of a system applied with a management system according to an embodiment.

Hereinafter, embodiments of the invention are described with reference to the drawings. The following descriptions and drawings are examples for illustrating the invention, are omitted and simplified as appropriate for clarification of the description, and do not limit the technical scope of the invention.

In the following description, various types of information may be described in terms of expressions such as "table," "list," and "queue," which, however, may be expressed by other data structures. Therefore, these expressions may be simply referred to as "information" to indicate independence from a data structure. The description of the various types of information uses terms such as "identification information," "identifier," "name," "ID," and "number", which, however, are interchangeable.

The following descriptions may be made using a "program" as a subject. The program performs a predetermined process by being executed by a processor (for example, a central processing unit (CPU) or a graphics processing unit (GPU)) while using storage resources (for example, a memory) or an interface device (for example, a communication device) as appropriate, and thus the descriptions may be made using the processor as the subject. Similarly, the subject of the processes performed by executing the program may be, for example, a controller, a device, a system, a computer, a node, a storage device, a server, a client, or a host including a processor. Further, the program may be partially or entirely processed by using a hardware circuit.

Various programs may be installed in computers by a program distribution server or a storage medium. In the following descriptions, two or more programs may be implemented as one program, or one program may be implemented as two or more programs.

In the drawings for illustrating the embodiments, units having the same function are denoted by the same reference numerals, and repetitive descriptions thereof are omitted.

Further, in the following descriptions, when depicting the same type of elements without distinguishing the elements from each other, reference signs (or common signs among the reference signs) may be used, and when depicting the same type of elements while distinguishing the elements from each other, identification numbers (or reference signs) for the elements may be used.

In order to facilitate understanding of the invention, a position, a size, a shape, a range, or the like of each component illustrated in the drawings may not represent an actual position, size, shape, range, or the like. Therefore, the invention is not necessarily limited to the position, size, shape, range, or the like illustrated in the drawings.

A management system according to the present embodiment may have the following configuration as an example.

That is, the management system according to the present embodiment relates to a side channel analysis technique. This technique based on Cloudoscopy provides a new method relating to detection of an internet protocol (IP) address, measurement of hop count, and verification of co-existing VMs. This new method is realized by using hardware interrupt, cloud scan, and time to live (TTL) scan.

Similar to the side channel analysis method, the management system according to the present embodiment proposes a new solution for detecting a relation between a server and a storage by probing a database with the aid of a data catalog and analyzing a network in order to detect a mapping.

The present embodiment proposes a method of detecting a mapping of data from a database application executable on a server or a virtual machine to a storage. The present embodiment does not require to install an agent in a customer environment. The relation detected in the present embodiment is useful in data management through end-to-end data flow visualization.

The present embodiment utilizes existing information from management software such as data catalogs and storage performance, thereby eliminating a need to acquire SSH authentication information for customer servers and to install any agent on these customer servers.

The data catalogs include access details of all databases existing in an organization. The access details include endpoints of tables and authentication information of databases. Since this information is already prepared in the data catalogs in an encrypted format, collection of authentication information is not necessary in the solution according to the present embodiment. When a customer is capable of accessing the data catalogs, an application programming interface (API) thereof may be directly used. These data catalogs also have a function of displaying contents of the tables via a data preview API.

Each time the tables are read via the data preview API, it is predicted that performances of a volume rapidly increase to some extent in the same time period. Performance data includes parameters such as an input/output per second (IOPS), a transfer rate, and a cache hit ratio. When such a read command is executed to tables having a small amount of data in a gigabyte (GB) level, a very large load is applied to the performance of the volume. This should be sufficiently significant for detection.

According to the above idea, a relation identification program can be constructed. This program triggers a read operation with respect to the tables of the data catalogs via the API (one table at one time). As a result, the databases read data from the storage and return a result thereof to the data catalogs.

This relation identification program also uses a storage API to acquire storage performances in parallel. The acquired performance data is time series data for performing an anomaly detection algorithm. Any anomaly detection algorithm may be considered in practical use. When a high anomaly score is detected in any volume during a period in which data preview is executed from the data catalogs, it can be concluded that the databases from which a preview command is read use an appropriate volume for data storage.

When a database memory is greater than a table size, a spike cannot be observed during reading, but the proposal may be applied to almost all practical cases. The present embodiment may be applied at any time in the case where the table size is greater than a database memory size. The present embodiment is also applicable if the data catalog has a write authority and the customer can write the data catalog while designating a sample space.

The present embodiment automates search of a relation between hundreds of servers and storages without requiring login authentication information, and thus also improves security. This provides various advantages such as end-to-end data flow, root cause analysis, and policy compliance. Usefulness thereof has been discussed in detail through a use case of deleting data.

Hereinafter, an embodiment of the invention is described with reference to FIGS. 1 to 10.

FIG. 1 is a block diagram illustrating an embodiment of an overall system infrastructure in a typical customer environment, which includes the management system according to the present embodiment. FIG. 1 illustrates each system present in the customer environment, how these systems interact with each other, and the relation identification program according to the present embodiment.

The customer environment includes a plurality of data catalog systems 6000, a plurality of server systems 2000, a plurality of storage systems 4000, and a management system 8000 according to the present embodiment.

The data catalog system 6000 includes a server processor 6100 that processes programs executable on the system. A server network adapter 6700 is responsible for system connectivity. A server storage adapter 6900 is useful for connecting a storage 6500 available on the network. The attached storage 6500 has multiple pieces of data 6510 thereon. A server memory 6300 has programs currently executed on the system. Typical programs executable on the server memory 6300 include a server OS 6310 and a data catalog application 6320. The data catalog application 6320 may be executed on a VM managed by a VM manager 6311 or may be executed on a bare metal computer. A110 is a bus connecting all components of the data catalog system 6000.

A plurality of the server systems 2000 executed in the customer environment can exist. Each server system 2000 includes a server processor 2100 that processes programs executed on the system. A server network adapter 2500 is responsible for system connectivity. A server storage adapter 2700 is useful for connecting an attached storage 2900 available on the network. A server memory 2300 is configured with programs currently executed on the system.

A server OS 2320 may execute a VM manager 2321. A VM 2310 may execute an application 2311 (which may be a database application or other applications) together with data 2312 thereof. An application 2301 may also be executed on a bare metal computer having data 2302. The data 2312 or 2302 is stored on a disk 2910 or 2920 of the attached storage 2900. A120 is a bus connecting all components of the server system 2000.

The storage system 4000 includes a server processor 4700 configured to process programs executable on the system. A network adapter 4500 is responsible for system connectivity. A network target adapter 4900 is useful for connecting storages to other systems via a network. A server memory 4100 is mainly configured with a storage operating system 4110. An array of the disks and volumes 4400 is connected by a storage adapter 4300. A130 is a bus connecting all components of the storage system 4000.

The management system 8000 includes a server processor 8300 configured to process programs executable on the system. A server network adapter 8700 is responsible for system connectivity. A server storage adapter 8900 is useful for connecting an attached storage 8500 available on the network. This attached storage 8500 may store multiple pieces of data 8510. A server memory 8100 is configured with programs currently executed on the system.

A data catalog management function 8110 extracts relation information on tables and databases from the data catalog system 6000 and stores the same as a setting 8111. This communication is illustrated as A520.

An application management function 8140 acquires all inter-application communication information from the server system 2000 and stores the information in a setting 8141. This communication is illustrated as A510.

A storage management function 8150 acquires performance data 8151 on all volumes and a setting 8152. A list thereof includes the volumes, the disks, and a relation therebetween. This communication is illustrated as A500.

A relation identification program 8120 is a main part of the management system 8000 according to the present embodiment. A communication of acquiring all settings and performance data from data in the data catalog management function 8110, the application management function 8140, and the storage management function 8150 is illustrated as an arrow A540. The communication calculates an end-to-end topology (as a setting 8121) from the data catalog to the database application and stores the same in a topology database 8130, as illustrated as an arrow A550. The topology database 8130 includes two attribute topology objects 8131 as nodes and a topology link 8132 as an edge between the nodes.

The topology is sent to a Web client 9000 and is visualized as a graphical user interface 9100. This connection is illustrated as an arrow A560. A100 is a bus connecting all components of the management system 8000.

FIGS. 2A and 2B are diagrams illustrating an example of an information table included in the management system according to the present embodiment.

In FIGS. 2A and 2B, an information table T1000 includes a performance data table T1100, a topology object T1200, a topology link T1300, a data catalog list T1400, a database list T1500, a table list T1600, and a volume list T1700.

T1100 is a performance data table and corresponds to the performance data 8151 in FIG. 1. The performance data table T1100 includes a time series T1110, an IOPS T1120, a transfer rate T1130, and the like as entries.

T1200 is a topology object table and corresponds to the topology object 8131 in FIG. 1. The topology object table T1200 includes an ID T1210 of a node, a name T1220 of the node, a type T1230 of the node, and the like as entries.

T1300 is a topology link table and corresponds to the topology link 8132 in FIG. 1. The topology link table T1300 includes an ID T1310 of a link, a name T1320 of a transmission source node (source), a name T1330 of a destination node (target), and the like.

T1400 is a data catalog list and corresponds to the setting 8111 of the data catalog management function 8110 in FIG. 1. The data catalog list T1400 includes an ID T1410 of a data catalog, a type T1420 of the data catalog, an IP T1430 of the data catalog, a user name T1440, a password T1450 of the data catalog, and the like as entries.

T1500 is a database list obtained from the data catalog and corresponds to the setting 8121 of the relation identification program 8120 in FIG. 1. The database list T1500 includes an ID T1510 of a database, a name T1520 of the database, a type T1530 of the database, and the like as entries.

T1600 is a table list obtained from the data catalogs and corresponds to the setting 8121 of the relation identification program 8120 in FIG. 1. The table list T1600 includes an ID T1610 of a table, a name T1620 of the table, a database T1630 to which the table belongs, and the like.

T1700 is a volume list and is obtained from the storage system 4000. The volume list T1700 corresponds to the setting 8152 of the storage management function 8150 in FIG. 1. The volume list T1700 includes an ID T1710 of a volume, an LDEV ID T1720 of the volume, a label T1730 of the volume, and the like.

Figure 3:
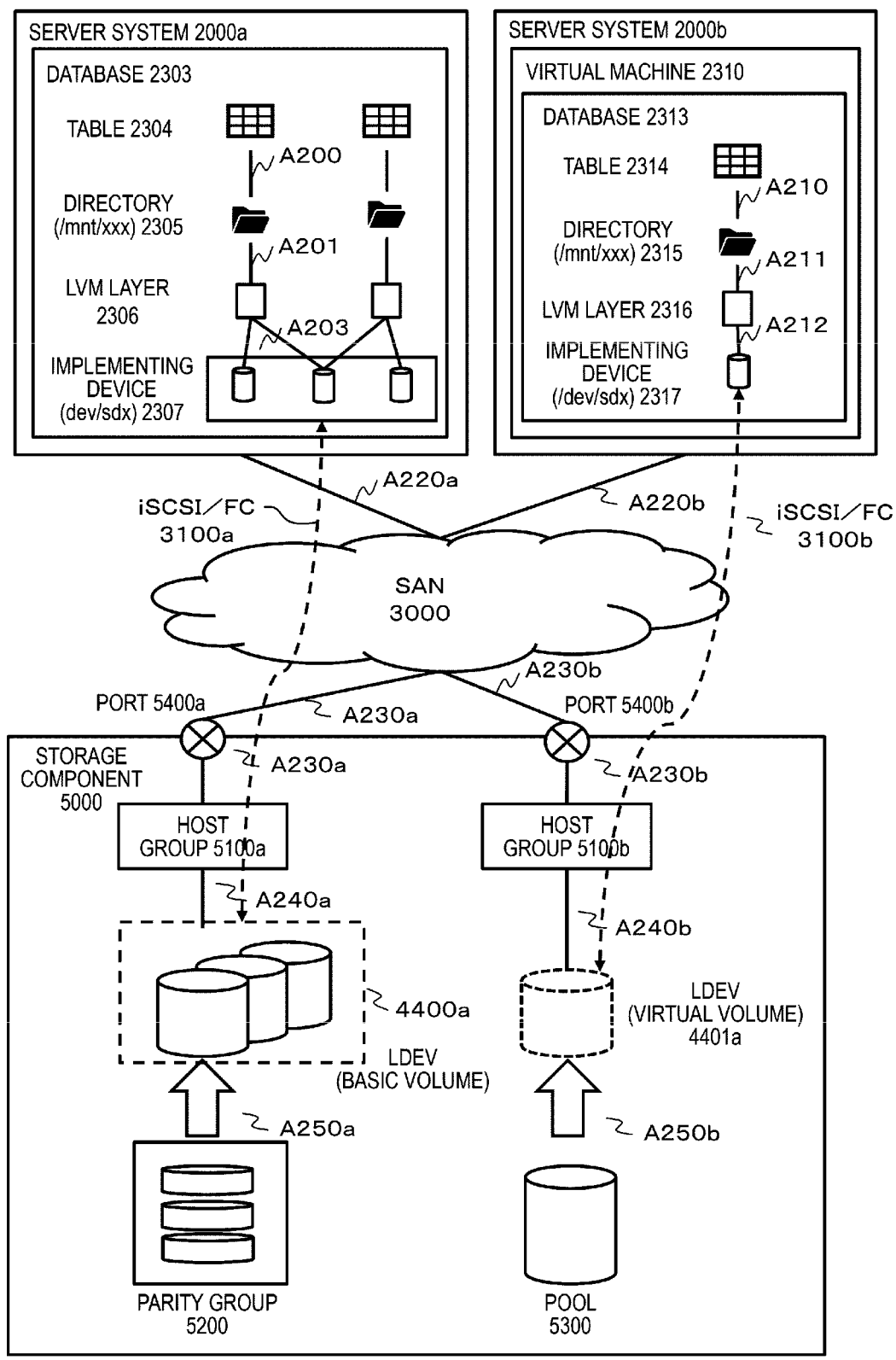
FIG. 3 is a diagram illustrating a mapping of storages in a system applied with the management system according to the embodiment.

FIG. 3 illustrates an example of a method for connecting the server system 2000 to the storage.

A server system 2000a executes a database application 2303 on a bare metal computer, while a server system 2000b executes a database application 2313 on a virtual machine 2310.

Tables 2304 and 2314 store data thereof in directories 2305 and 2315, respectively. These connections are illustrated as arrows A200 and A210, respectively. These directories 2305 and 2315 reside in implementing devices 2307 and 2317, respectively. These relations are managed by LVM layers 2306 and 2316, respectively. Relations between the directories and the LVM layers are illustrated as A201 and A211. Relations between the LVM layers and the implementing devices are illustrated as A203 and A212.

The server system 2000 is connected to a storage component 5000 via a storage area network (SAN) 3000. This connection is illustrated as arrows A220a, A220b, A230a, and A230b.

Ports 5400a and 5400b connect the server to the volume. The port 5400 may manage connections between groups of the server system 2000 and groups of volumes represented by host groups 5100a and 5100b. A relation between the host group and the port is illustrated as A230a and A230b. A relation between the host group and the volume is illustrated as A240a and A240b.

The volume is an array of basic volumes 4400a divided from an array of disks known as a parity group 5200. This connection is illustrated as an arrow A250a. The volume can be a virtual volume 4401a divided through a pool 5300 of disks. This connection is made immediately by an arrow A250b.

The volumes 4400a and 4401a are mapped to the implementing devices 2307 and 2317 with the aid of protocols such as iSCSI/FC 3100a and 3100b. Unique names of the source and the target are managed by these protocols.

FIG. 4 illustrates an example in which data can be acquired at each layer to detect an end-to-end relation topology of the data.

An information item T2000 may be acquired from the data catalog application 6320. The data catalog application 6320 is connected to the server system 2000 with reference to an internet protocol (IP):port 3200. An information item T3000 may be searched from the server system 2000 by logging into the server using the SSH authentication information. The server system 2000 is connected to the volume 4400 by a protocol such as iSCSI/FC 3100. An information item T4000 may be acquired from storage software executable on the storage system 4000.

Figure 5:
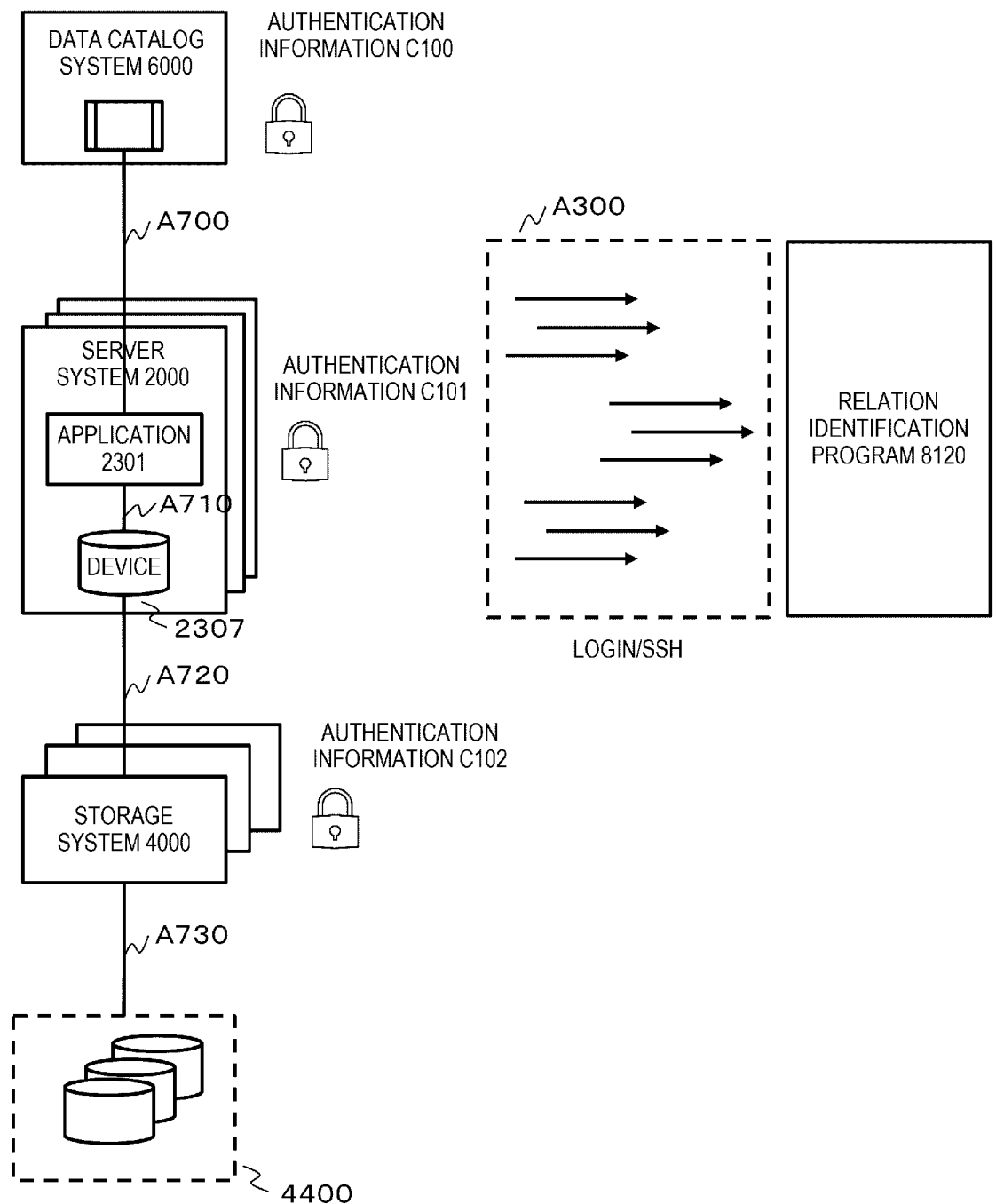
FIG. 5 is a diagram for illustrating a problem that may generally occur in the system applied with the management system according to the embodiment.

FIG. 5 illustrates a problem that occurs when logging into the system to acquire the relation data.

The data catalog system 6000 includes authentication information (credential) C100. The storage system 4000 includes authentication information C102. Hundreds of service systems having the authentication information C101 of the server system 2000 may be deployed. The data catalog system 6000 has an access authority to all database applications 2301 in the server system 2000, which is illustrated as an arrow A700. The storage system 4000 may include an array of volumes and disks 4400, which is illustrated by an arrow A730. The application 2301 uses an implementing device 2307 for storage volumes, as illustrated by an arrow A710.

The problem is that the relation identification program 8120 needs to log into hundreds of server systems 2000 to acquire mount information A720. This requires collection of hundreds of pieces of login/SSH authentication information of the server systems 2000, which is difficult to collect and is subject to security issues. This is illustrated as an arrow A300.

Figure 6:
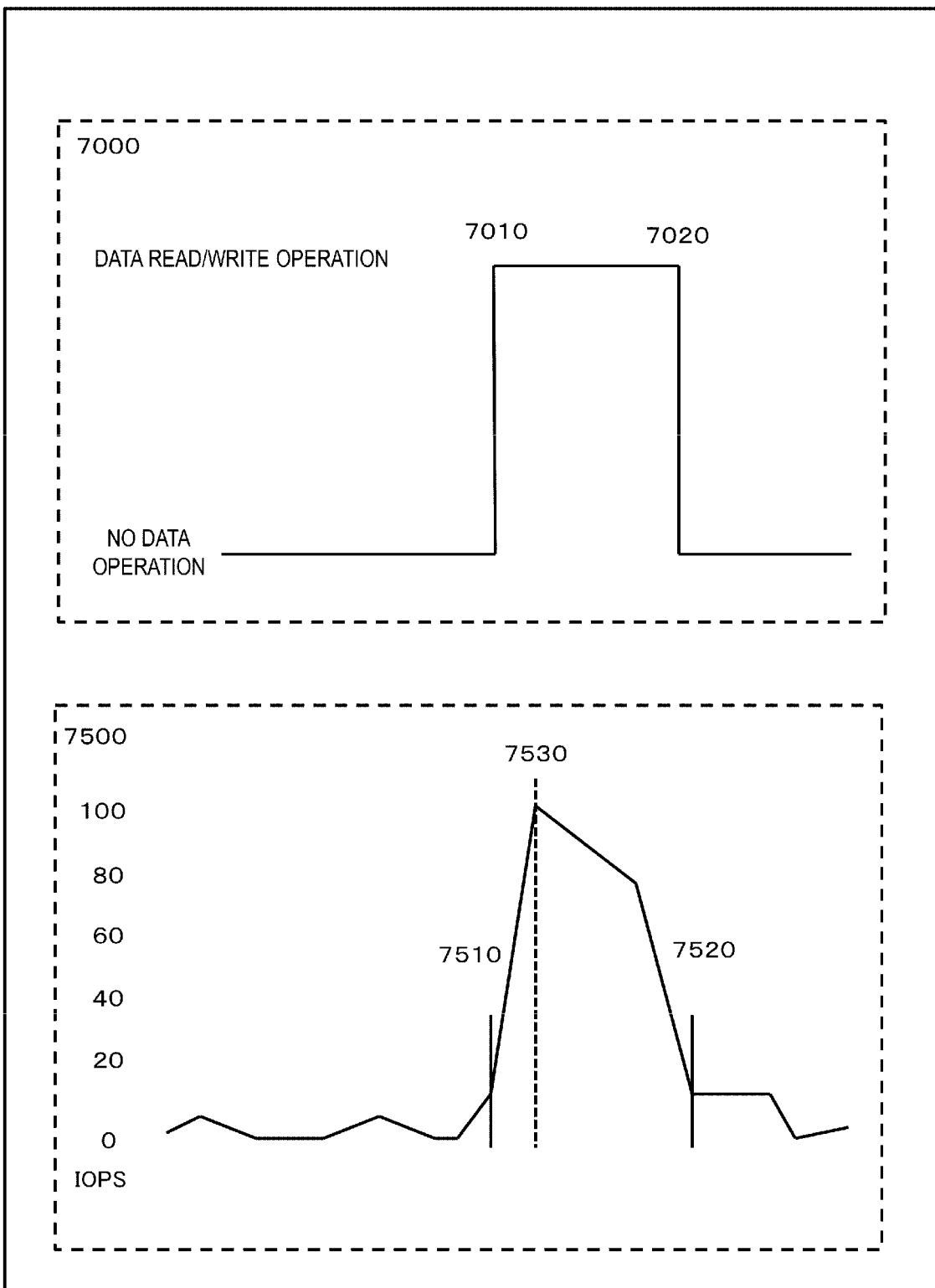
FIG. 6 is a diagram illustrating an example of an operation of the management system according to the embodiment.

FIG. 6 illustrates a core concept of the relation identification program 8120. This core concept is based on a side channel analysis type. Ideally, a spike in a performance is expected to occur in a volume each time a load is generated in the data catalog for reading or writing a table.

7000 illustrates an operation for data in the data catalog. High means a read/write operation, and low means no operation. In this example, the read operation is performed at a time 7010 to 7020.

7500 illustrates a performance of the volume. The IOPS, the transfer rate, or the cache hit ratio may be used as an index for indicating the performance of the volume. An anomaly occurs from times 7510 to 7520. The time 7510 is the same as the time 7010, and the time 7520 is the same as the time 7020. A peak of the spike is at a time 7530.

Figure 7:
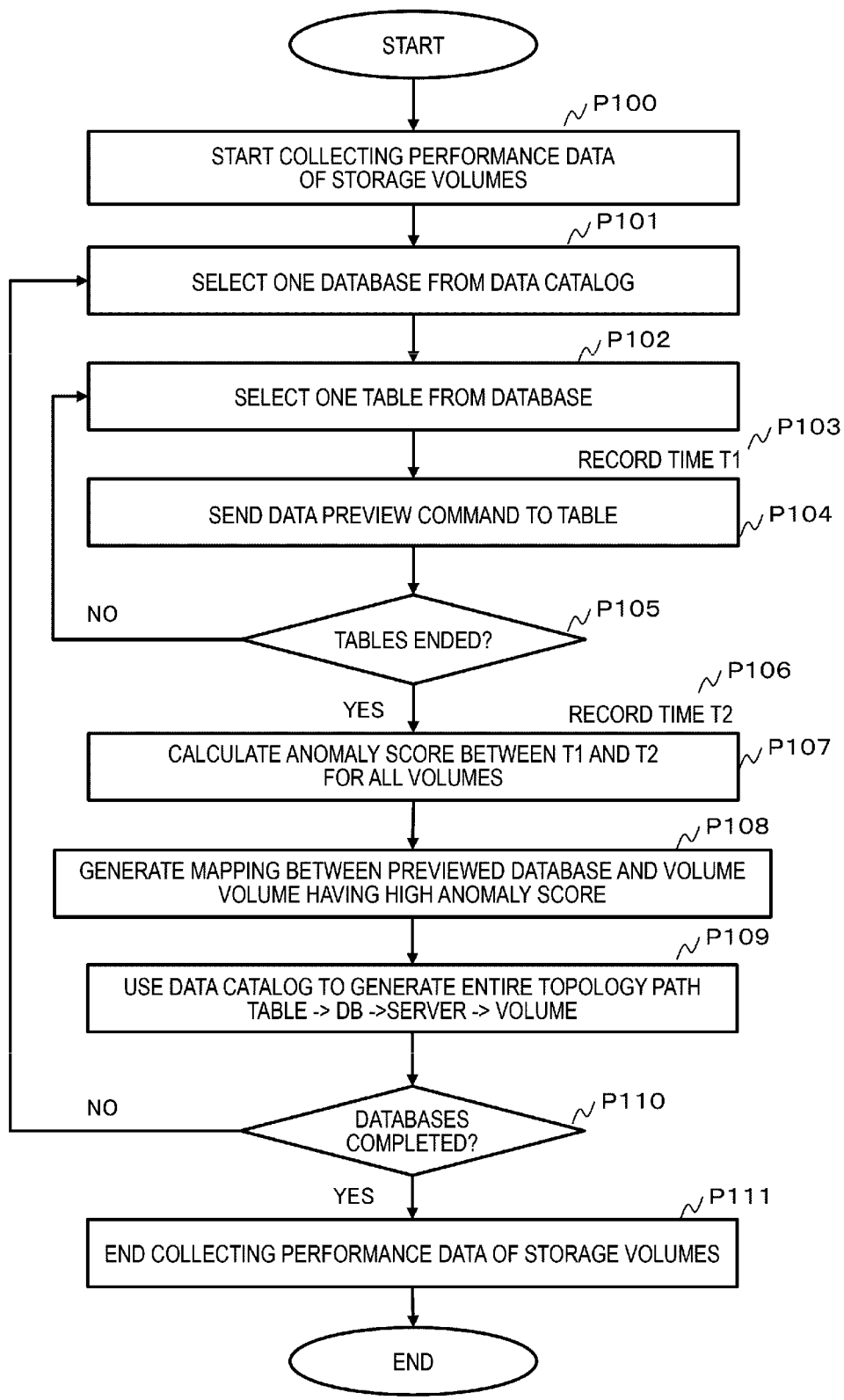
FIG. 7 is a flowchart for illustrating an example of the operation of the management system according to the embodiment.

FIG. 7 is a flowchart illustrating in detail how the management system 8000, particularly the relation identification program 8120 according to the present embodiment, detects a data relation.

First, the relation identification program 8120 acquires performance data of all the volumes, in P100. Next, in P101, the relation identification program 8120 selects one database from a list of databases present in the data catalog. Next, in P102, the relation identification program 8120 selects one table from the database selected in P101.

Next, in P103, the relation identification program 8120 starts time measurement. At this time, a time measurement start time is set to T1. Next, in P104, the relation identification program 8120 uses a data catalog API to perform a process of sending a data preview command to the table selected in P102 and reading content of the selected table.

In P105, the relation identification program 8120 determines whether all operations illustrated as P102 to P104 have been performed on all the tables. When it is determined that the operations have been performed on all the tables (YES in P105), the process proceeds to P106. When it is determined that the operations have not been performed on all the tables (NO in P105), the process returns to P102 to continue the operations.

In P106, the relation identification program 8120 ends the time measurement. At this time, a time measurement end time is set to T2. Next, in P107, the relation identification program 8120 calculates an anomaly score between the time T1 and the time T2 for all the volumes. In P108, when a volume gives a high anomaly score among the anomaly scores calculated in P107, the relation identification program 8120 generates a mapping between the read database and this volume. Subsequently, in P109, the relation identification program 8120 acquires relevant information from the tables to the databases to generate the entire mapping (table→database→server→volume).

Subsequently, in P110, the relation identification program 8120 determines whether the operations illustrated in P102 to P109 have been performed on all the databases. When it is determined that the operations have been performed on all the databases (YES in P110), the process proceeds to P111. When it is determined that a database on which the operations have not been performed is still present (NO in P110), the process returns to P101 to continue the operations. Subsequently, in P111, the relation identification program 8120 ends the acquisition of the performance data of the storage volumes.

Figure 8:
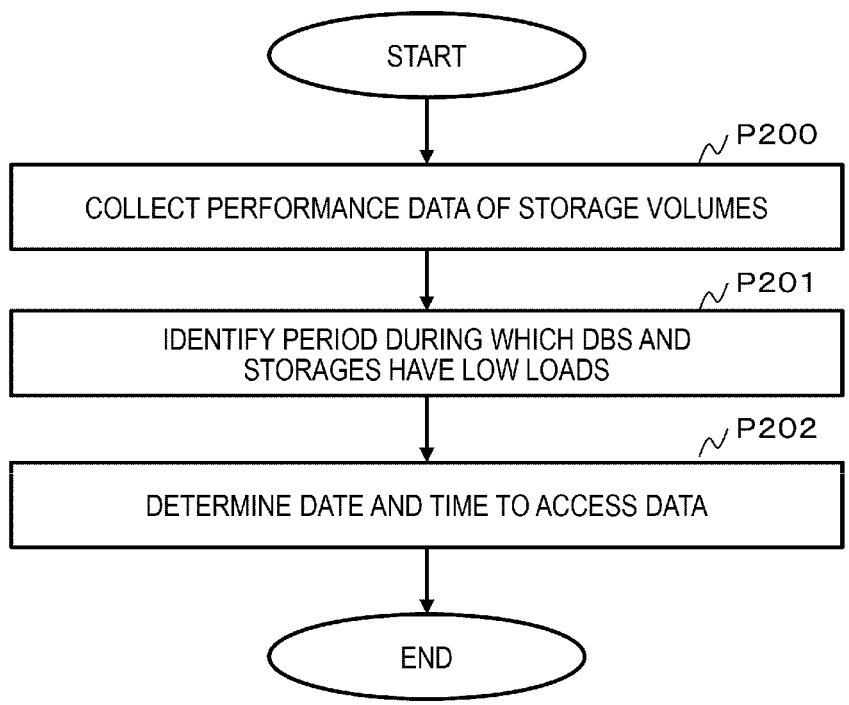
FIG. 8 is a flowchart for illustrating an example of a preliminary operation of the management system according to the embodiment.

FIG. 8 is a flowchart illustrating an example of operations that are preferably performed prior to the operations of the management system according to the present embodiment illustrated in the flowchart of FIG. 7 when the operations illustrated in FIG. 7 are performed.

First, in P200, the relation identification program 8120 acquires the performance data of all the volumes as a background task. Next, in P201, the relation identification program 8120 identifies a period during which loads on the databases (DBs) and the storages are low. The period during which the loads are low is a period during which a load of each component constituting the storage is less than a value indicating overload even when a process according to the data preview command is performed. The period during which the loads are low may be identified by, for example, measuring in advance a degree of increase in the load when the process corresponding to the data preview command is performed and determining whether a value obtained by adding the degree of increase to a current load is less than a threshold indicating overload, or may be identified by setting a threshold value indicating a low load in an operation rate of each component and determining whether the load is less than the threshold value. In P202, the relation identification program 8120 determines date and time to access the data with reference to the period identified in P201.

Figure 9:
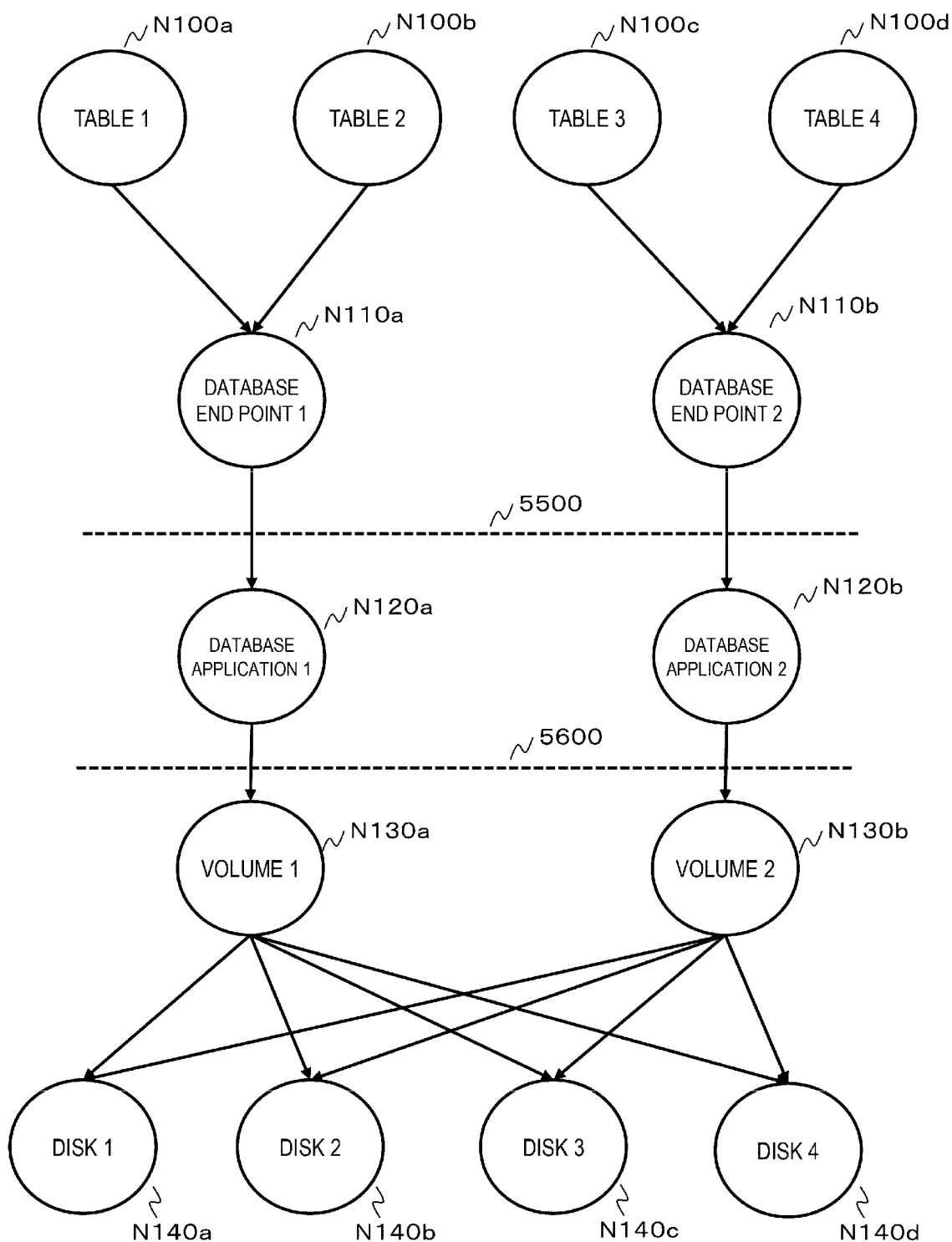
FIG. 9 is a diagram illustrating an example of a topology that can be acquired by the management system according to the embodiment.

FIG. 9 illustrates a topology graph generated by the management system 8000 according to the present embodiment.

N100 indicates all tables derived from the data catalog. N110 is a database endpoint derived from the data catalog and includes important information such as the IP address, the port, and the qualification information of the database. A database application N120 is constituted by names and meta data of applications existing in a cluster. N130 is a volume mounted on N120. N140 is a disk in which the volume is present.

At 5500, a data catalog view is divided from an application view. At 5600, the application view and a storage view are separated from each other.

Figure 10:
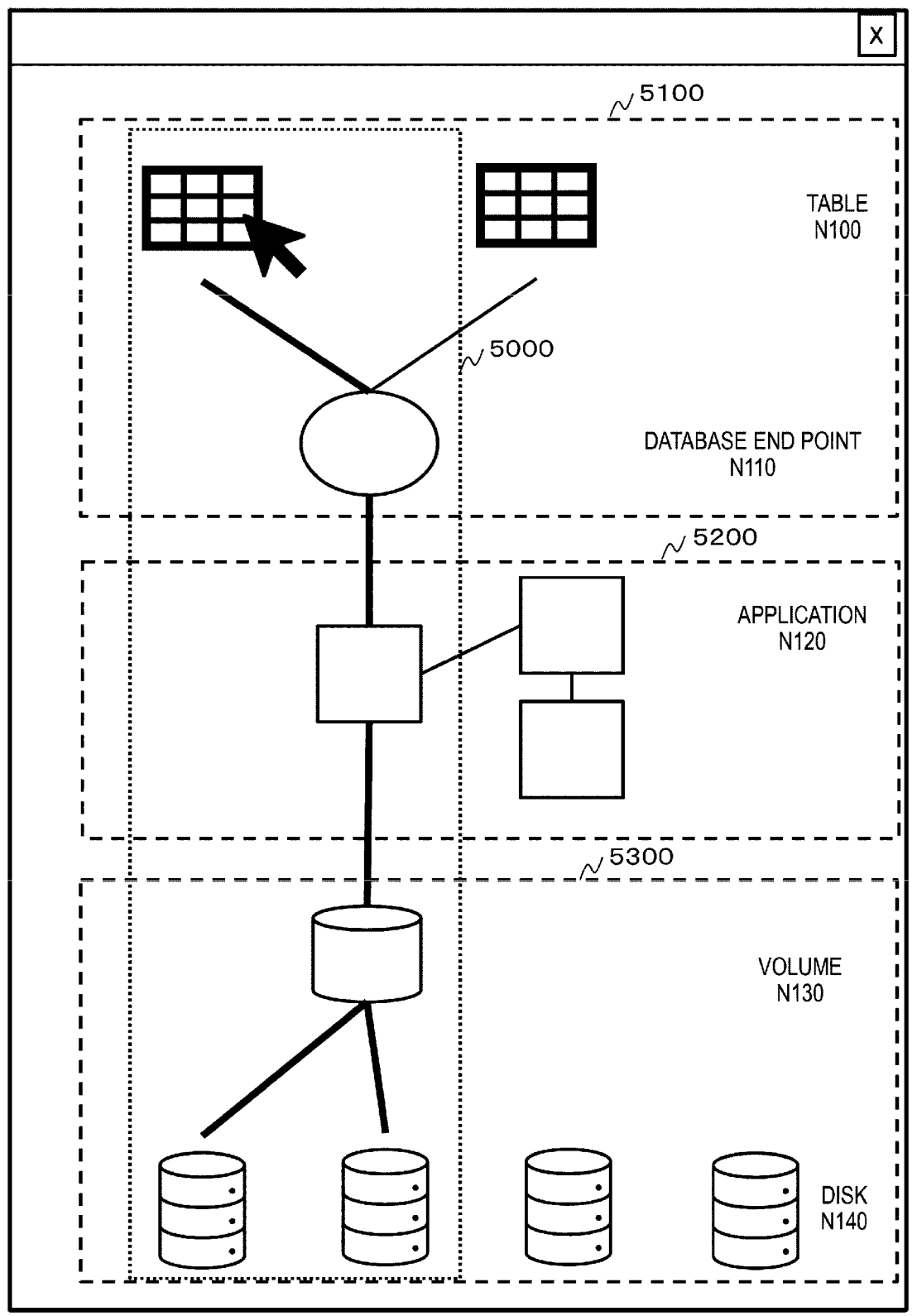
FIG. 10 is a diagram illustrating an example of a GUI which is an output result of the management system according to the embodiment.

FIG. 10 is a diagram illustrating an example of a graphical user interface (GUI) generated by the management system 8000 according to the present embodiment. The GUI 9100 illustrated in FIG. 10 is displayed by the Web client 9000.

5100 is the data catalog view, 5200 is the application view, and 5300 is the storage view. 5000 is a highlighted end-to-end path of a clicked table. N100 is a layer illustrating all the tables. N110 is a layer illustrating all the database endpoints. N120 is a layer illustrating all the applications. N130 is a layer illustrating all the volumes. N140 is a layer illustrating all the disks.

As described above in detail, according to the management system 8000 according to the present embodiment, it is possible to manage the relation between the database and the volume without installing an agent.

Although a main embodiment of the invention is described above, the embodiment is an example for describing the invention and is not intended to limit the scope of the invention to the embodiment. It is not always necessary to include all the configurations described above, and a part of a configuration of one embodiment may be replaced with or added to a configuration of another embodiment. Similarly, a part of the configuration of each embodiment may be changed or deleted as necessary.

A part or all of the configurations, functions, processing units, processing methods, or the like described above may be implemented by hardware such as through design using an integrated circuit. Further, the invention can also be implemented by program codes of software that implements the functions of the embodiment. In this case, a storage medium recording the program codes is configured on a computer, and a processor included in the computer reads out the program codes stored in the storage medium. In this case, the program codes read out from the storage medium implement the functions of the above embodiments, and the program codes and the storage medium storing the program codes constitute the invention. Examples of the storage medium for supplying such program codes include a flexible disk, a CD-ROM, a DVD-ROM, a hard disk, a solid state drive (SSD), an optical disk, a magneto-optical disk, a CD-R, a magnetic tape, a nonvolatile memory card, or a ROM.

For example, the program codes that implement the functions described in the present embodiment can be implemented by a wide range of programs or script languages, such as an assembler, C/C++, Perl, Shell, PHP, Java (registered trademark), and Python.

In the embodiments described above, control lines and information lines are considered to be necessary for description, and the control lines and information lines are not all necessarily shown in the product. All configurations may be connected to each other.

What is claimed is:

1. A management system, the management system comprising:
    a processor, wherein the processor is configured to:
    identify a volume storing data to be used by a database on a basis of a number of accesses;
    access data that is included in the database and that includes login authentication information of the volume;
    detect the number of accesses to the volume in a time range including a timing of the access to the data that is included in the database; and
    manage a relation between the database and the volume on a basis of the number of accesses, for implementing in data management through end-to-end data flow visualization, without installing an agent on a customer environment,
    wherein the relation is determined by utilizing existing information from management software including a database catalog and storage performance without applying the login authentication information of the volume; and
    identify, based on the managing of the relation, a volume to which the number of accesses is increased in a range as the volume storing the data to be used by the database.

2. The management system according to claim 1, wherein the processor is configured to access the data including the authentication information of a volume by initiating a read-out request of the data and/or issuing a data preview command to the data.

3. The management system according to claim 1, wherein the number of accesses is at least one of an input/output per second (IOPS), a transfer rate, and a cache hit ratio for a volume.

4. The management system according to claim 1, wherein the processor is configured to manage the relation between the database and a volume on a basis of an anomaly score of the volume based on the number of accesses.

5. The management system according to claim 1, wherein the processor is configured to access the database catalog of the database including the authentication information of a volume.

6. The management system according to claim 1, wherein the processor is configured to detect a period during which the database and a volume have low loads, and to access the data including the authentication information of the volume in the period.

7. The management system according to claim 1, wherein the processor is configured to generate data for displaying a graphical user interface (GUI) configured to visualize the relation between the database and the volume.

8. A method for management by a management system, the method for management comprising:
    identifying, by a processor, a volume storing data to be used by a database on a basis of a number of accesses;
    accessing, by the processor, data that is included in the database and that includes login authentication information of the volume;
    detecting, by the processor, the number of accesses to the volume in a time range including a timing of the accessing to the data that is included in the database; and
    managing, by the processor, a relation between the database and the volume on a basis of the number of accesses, for implementing in data management through end-to-end data flow visualization, without installing an agent on a customer environment,
    wherein the relation is determined by utilizing existing information from management software including a database catalog and storage performance without applying the login authentication information of the volume; and identifying, based on the managing of the relation, a volume to which the number of accesses is increased in a range as the volume storing the data to be used by the database.

9. A non-transitory computer-readable recording medium encoded with a computer program, wherein the computer program, when executed by a computer, causes the computer to:

identify a volume storing data to be used by a database on a basis of a number of accesses;

access data that is included in the database and that includes login authentication information of the volume;

detect the number of accesses to the volume in a time range including a timing of the access to the data that is included in the database; and manage a relation between the database and the volume on a basis of the number of accesses, for implementing in data management through end-to-end data flow visualization, without installing an agent on a customer environment, wherein the relation is determined by utilizing existing information from management software including a database catalog and storage performance without applying the login authentication information of the volume; and identify, based on the managing of the relation, a volume to which the number of accesses is increased in a range as the volume storing the data to be used by the database.

* * * * *